United States Patent [19]

Matsumoto

[11] Patent Number: 4,659,213
[45] Date of Patent: Apr. 21, 1987

[54] METHOD AND APPARATUS FOR DETECTING AND PROCESSING IMAGE INFORMATION

[75] Inventor: Fumio Matsumoto, Tokyo, Japan

[73] Assignee: Fuji Photo Film Co., Ltd., Kanagawa, Japan

[21] Appl. No.: 845,121

[22] Filed: Mar. 27, 1986

[30] Foreign Application Priority Data

Apr. 8, 1985 [JP] Japan .................................. 60-73793
Aug. 2, 1985 [JP] Japan ................................ 60-170833

[51] Int. Cl.[4] ...................... G03B 27/32; G03B 27/80
[52] U.S. Cl. ........................................ 355/38; 355/40; 355/77
[58] Field of Search ....................... 355/38, 39, 40, 41, 355/68, 77; 250/571, 559

[56] References Cited

U.S. PATENT DOCUMENTS 4,264,196 4/1981 von Stein et al. ................ 355/38 X
4,264,197 4/1981 Pone et al. ............................. 355/41
4,353,641 10/1982 Merlo ..................................... 355/38
4,417,811 11/1983 Hamer ................................... 355/77
4,448,521 5/1984 Shiota ............................. 355/38 X
4,518,252 5/1985 Ohtsuka ........................... 355/40 X
4,574,692 3/1986 Wahli ............................... 355/40 X
4,577,961 3/1986 Terashita ......................... 355/38 X Primary Examiner—Richard A. Wintercorn
Attorney, Agent, or Firm—Wenderoth, Lind & Ponack

[57] ABSTRACT

A method and apparatus for detecting and processing image information for detecting and reading out information which has been recorded on the marginal portions of a film negative sheet which are outside the image frames thereof. The marginal information is either printed or recorded on another recording medium together with the image information contained within the frames. The marginal information may be used during photographic printing so as to discriminate the front surface from the back surface thereof and/or to discriminate the top surface of the film from the bottom surface of the film.

13 Claims, 18 Drawing Figures

FIG. 6A
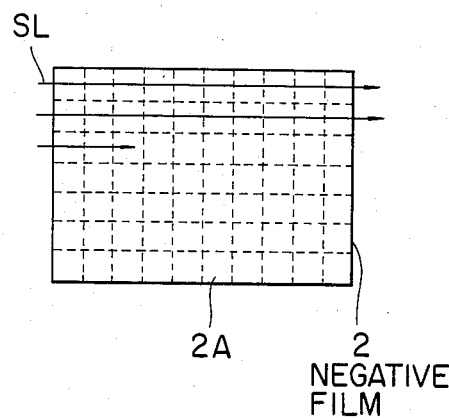
FIG. 6B
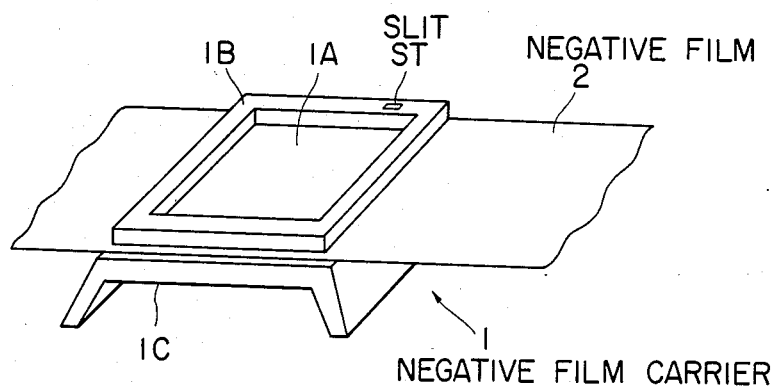
FIG. 7

FIG. 8A

| 145 | 136 | 120 | 123 | 128 | 135 | 136 | 140 | 153 | 150 |
|---|---|---|---|---|---|---|---|---|---|
| 150 | 142 | 119 | 120 | 125 | 127 | 129 | 133 | 142 | 152 |
| 155 | 148 | 49 | 53 | 52 | 60 | 58 | 17 | 130 | 158 |
| 152 | 150 | 35 | 13 | 14 | 15 | 15 | 8 | 126 | 157 |
| 153 | 152 | 31 | 0 | 0 | 0 | 0 | 4 | 120 | 156 |
| 155 | 147 | 29 | 0 | 0 | 0 | 0 | 3 | 115 | 155 |
| 157 | 145 | 31 | 0 | 0 | 0 | 0 | 1 | 108 | 152 |
| 155 | 150 | 34 | 12 | 14 | 14 | 18 | 24 | 110 | 155 |
| 150 | 148 | 42 | 45 | 52 | 54 | 65 | 73 | 120 | 153 |
| 145 | 150 | 108 | 110 | 115 | 118 | 126 | 130 | 132 | 152 |
| 143 | 152 | 155 | 157 | 160 | 160 | 155 | 150 | 145 | 150 |

FIG. 8B

| 32 | 36 | 35 | 33 | 31 | 37 | 36 | 37 | 35 | 40 |
|---|---|---|---|---|---|---|---|---|---|
| 30 | 5 | 4 | 3 | 2 | 5 | 4 | 6 | 8 | 42 |
| 33 | 0 | 0 | 0 | 0 | 0 | 0 | 0 | 0 | 39 |
| 34 | 0 | 0 | 0 | 0 | 0 | 0 | 0 | 0 | 37 |
| 35 | 0 | 0 | 0 | 0 | 0 | 0 | 0 | 0 | 36 |
| 36 | 0 | 0 | 0 | 0 | 0 | 0 | 0 | 0 | 37 |
| 36 | 0 | 0 | 0 | 0 | 0 | 0 | 0 | 0 | 39 |
| 35 | 0 | 0 | 0 | 0 | 0 | 0 | 0 | 0 | 40 |
| 34 | 0 | 0 | 0 | 0 | 0 | 0 | 0 | 0 | 42 |
| 35 | 7 | 6 | 5 | 5 | 6 | 5 | 4 | 6 | 43 |
| 36 | 38 | 39 | 40 | 42 | 44 | 43 | 42 | 40 | 42 |

FIG. 12

METHOD AND APPARATUS FOR DETECTING AND PROCESSING IMAGE INFORMATION

BACKGROUND OF THE INVENTION

This invention relates to a method and apparatus for detecting and processing image information which reads and processes not only image information in frames on an original film, such as negative film, but also the information located on the peripheral areas thereof, such as bar codes provided therein for photographic image handling, so as to discriminate the front surface of the film from back surface of the film or the top of a picture frame from the bottom of the picture frame.

In a photographic printing system it is necessary to measure the density of an original film (for instance, a negative film) in order to determine the printing exposure amount or the correction amount thereof. The average density of a negative film is conventionally measured photographically with respect to its LATD (Large Area Transmittance Density) by using photosensors such as photodiodes provided near the optical path of the optical system used for printing. The negative film is formed by developing a film negative. The LATD method, however, is an image detection technique to photographically measure a negative film generally but not a method to measure the image density of a negative film correctly or across the whole frame. The printing exposure or correction obtained by the LATD measuring method does not therefore quite meet strict requirements. When the negative film is printed on photographic paper, it is necessary to change the exposure amount or the correction amount depending on the size, manufacturer, or sensitivity of the film due to the difference, in light diffusion particular to each film. These differences are conventionally observed and determined visually and inputted manually from a keyboard or determined by a separate device and signals thereof are read out from an information transmission medium. Such key manipulation and signal processing are not only cumbersome but susceptible to errors in inputting.

There has recently been proposed a method which records the name of the film maker and the type of film on each half frame along a longitudinal side of a negative film in the form of bar codes in latent images which are to be imaged after development. FIG. 1A shows an example of the negative film provided with such bar codes. More particularly, perforations 201 and 202 are punched on both sides of the negative film 2 and bar code information 203 is recorded at a predetermined position between the perforations 202 and the edge of the negative film 2 to supply the data, information and so on necessary for printing a frame 204 of the negative film 2. When the negative film 2 is printed by a photographic printer, the bar code information 203 recorded on the negative film 2 is read out by a device such as a bar code reader or a line sensor; a channel is set according to the type of negative film; the image information obtained by measuring the film with the LATD method is processed to determine the exposure amount, and the negative film is finally printed with the thus determined exposure amount. In the prior art, the photographic measurement of frame images 204 on the negative film 2 and the reading out of the bar code information 203 attached thereon are separately conducted while an elongated negative film is being moved. However, the operation involves complicated devices and processing, and hence a solution has long been demanded.

Moreover, it is desired to provide a simple method for readily reading a side belt 206 in a latent image on area of the perforations 202 which is temporarily colored for identification when the type of emulsion is drastically changed, or reading the masking and color balance on the film carrier so as to obtain more information for printing conditions on the negative film 2. Conventional methods have been proposed to output the frame number 205 in latent image of the side prints which are excluded from the information of the bar code 203 at a display unit, or to record the same on a photographic paper 7 corresponding to the frame 204 for facilitating placement of reprinting orders. Those methods, however, are not quite practicable in one way or other.

In typical photographic printing systems, when a negative film is mounted in the system, the front or back surface and the top or bottom direction of the negative film is usually judged visually, which sometimes causes upside down prints or reversed prints. If the negative film is printed on its wrong surface, the printed images are inverted and the printing must be redone. If a frame is printed upside down, it present further problems in determining the printing exposure amount or correction amount. Since the prior art device measures only frame images, it is incapable of detecting and correcting the condition if chronological deterioration occurons an unused film or if the balance in density or color is disturbed due to abnormal development, etc.

SUMMARY OF THE INVENTION

This invention was contrived in order to obviate aformentioned prior art defects and aims at providing a method and apparatus which can detect and read out the information which is recorded on the marginal portions of a negative film sheet and outside the frames for printing and recording the images such as bar codes, side printing (frame number, product name, manufacturer name, etc.), side belt, the color of the film carrier, notches, marks, etc. on another recording medium together with the image information.

Another object of this invention is to provide a method and apparatus for detecting and reading out the bar codes recorded outside of the original film images together with the image information during photographic printing so as to discriminate the front surface of the film from the back surface thereof or to discriminate the top surface of the film from the bottom surface of the original film.

According to one aspect of this invention, for achieving the objects described above, there is provided a photographic image information detecting method which comprises the steps of: receiving light from an original film by an image sensor; detecting image information of all areas received by said image sensor in a unit of a pixel obtained by segmenting a frame; and detecting marginal information recorded outside the frame of said original film.

According to another aspect of this invention, there is provided a photographic image information detecting device comprising a light system which illuminates the whole area of a mounted original film in a unit of one frame; an image sensor which focuses and receives the light through said original film, and a control system which drives said image sensor and controls reading whereby frame image information recorded on said original film as well as marginal information recorded outside of said frames are detected by said image sensor.

Further, according to still another aspect of this invention, there is provided an image information detecting and processing method which comprises the steps of: receiving light from an original film by a line sensor; detecting image information outside of a frame of said original film from which a line sensor receives light in a unit of a pixel; reading out marginal information on said frame recorded outside if said frame of said original film; and discriminating front surface of the film from the back surface thereof and/or the top of the film from the bottom of said original film.

Still further, according to another aspect of this invention, there is provided a method for detecting and processing image information which comprises the steps of: receiving light from an original film by an image sensor; detecting image information received by said image sensor in a unit of a pixel obtained by segmenting a frame; reading out marginal information on said frame recorded outside of said frame of said original film; and discriminating the front surface of the film from the back surface thereof and/or the top of the film from the bottom of said original film.

The nature, principle and utility of the invention will become more apparent from the following detailed description when read in conjunction with the accompanying drawings.

BRIEF DESCRIPTION OF THE DRAWINGS

In the accompanying drawings:

FIGS. 6A and 6B are views which illustrate the correspondence between thepixel segmentation of the film original image and the stored data;

FIG. 7 is a view which shows the printing section in detail;

FIGS. 8A and 8B are charts of the memory which show examples of image information, respectively;

FIG. 12 is a view which shows an example of a memory according to this invention.

DESCRIPTION OF THE PREFERRED EMBODIMENTS

Figure 1A:
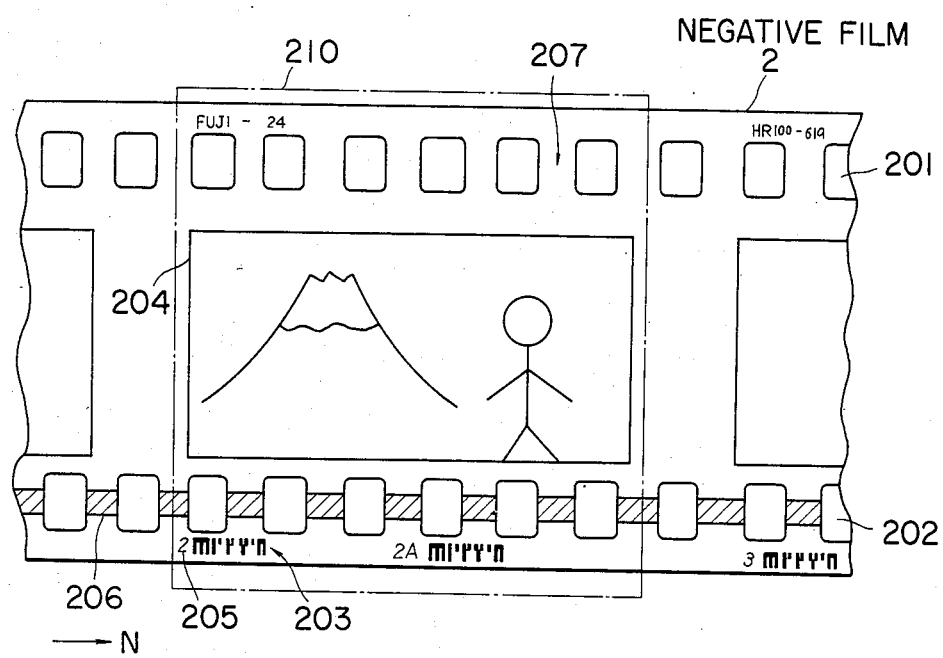
FIGS. 1A through 1D show examples of a negative film provided with bar code information.

According to this invention, an area sensor or a two-dimensional image sensor detects the whole image information on a negative film 2 which is provided additionally with information recorded in latent images on the periphery of the frames, such as bar codes 203, so that they are imaged after development as illustrated in FIG. 1A. The detectable area is set as a frame 204 and a larger area 210 which covers the region wider than the whole width of the negative film 2 as shown in FIG. 1A. If the sensors detect the area wider than the width of the negative film 2, it becomes possible to detect and read not only the frame image 204 but also all of the other information recorded on the margins of the negative film 2 such as bar code information 203, side printing 205, side belts 206, film carrier color 207 etc.

Figure 2:
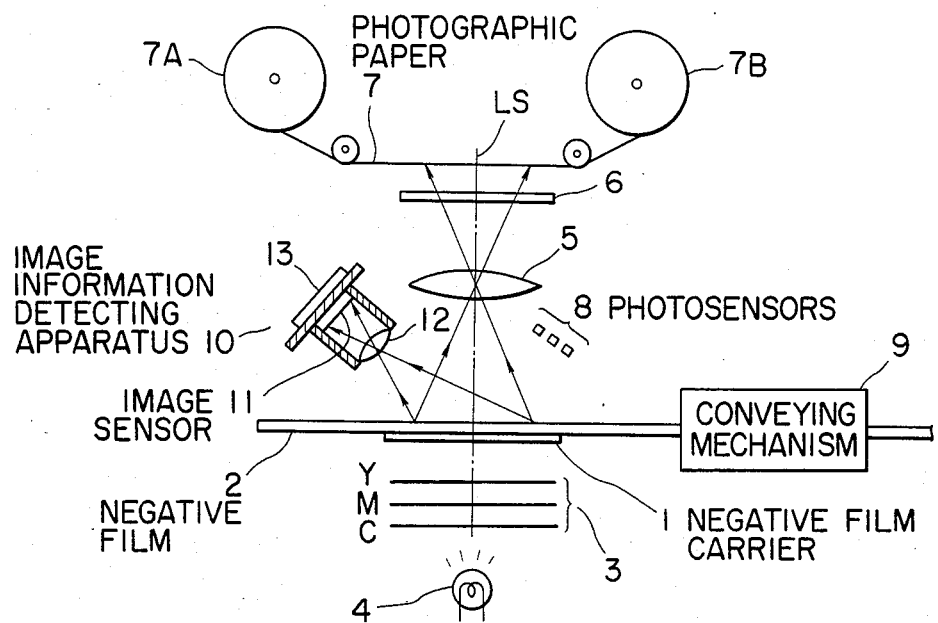
FIG. 2 is a structural view of a two-dimensional image sensor used for image information detection.

The present applicant has proposed a device shown in FIG. 2 in order to obviate such prior art defects (U.S. patent application Ser. No. 691,309 to Fumio Matsumoto). FIG. 2 shows one example of application of an image information detecting apparatus 10 in a conventional photographic printing system wherein the negative film 2 positioned on a negative film carrier 1 which has been conveyed to a printing section by a conveying mechanism 9 is illuminated with light from a light source 4 via color compensation means 3 of three complementary colors of yellow (Y), magenta (M) and cyan (C), and the light transmitted through the negative film 2 is directed to a sheet of photographic paper 7 via a lens unit 5 and a black shutter 6. The photographic paper 7 is coiled on a supply reel 7A, paid out and wound on a take-up reel 7B in a synchronized movement with the conveying or suspending movement of the negative film 2. Photosensors 8 such as photodiodes are provided near the negative film 2 on the side of the lens unit 5 and detect image density information of red (R), green (G) and blue (B) or of the three primary colors. The detection signal from the photosensors 8 is used in photographic printing. The image information detecting apparatus 10 is provided near the negative film 2 at an inclined angle from the optical axis LS of the light source 4 and the negative film 2. The apparatus houses a two-dimensional image sensor 11 comprising a CCD (Charge Coupled Device) or an MOS (Metal Oxide Semiconductor) device and in front of the image sensor 11 is located a lens unit 12 which focuses substantially at the center of the negative film 2. The image information detecting apparatus 10 is constructed as a unit having on the reverse side a substrate 13 which is packaged with a processing circuit of ICs (integrated circuits), for image processing.

Figure 3:
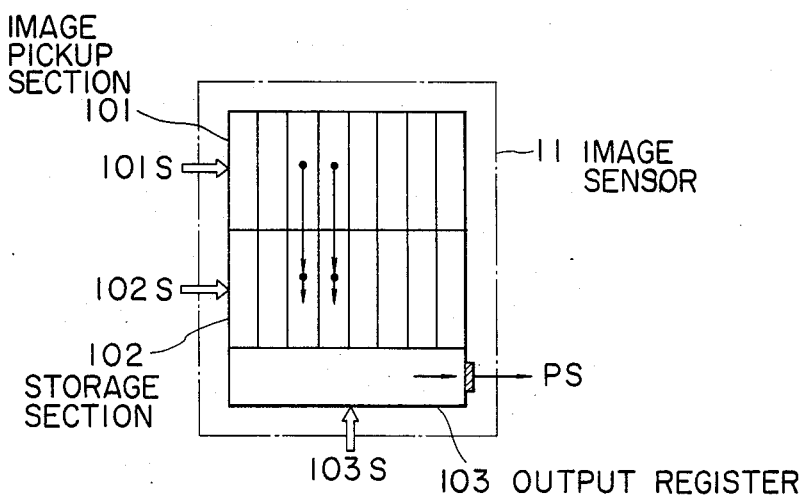
FIG. 3 is a structural view which shows the function of the two-dimensional image sensor.
Figure 4:
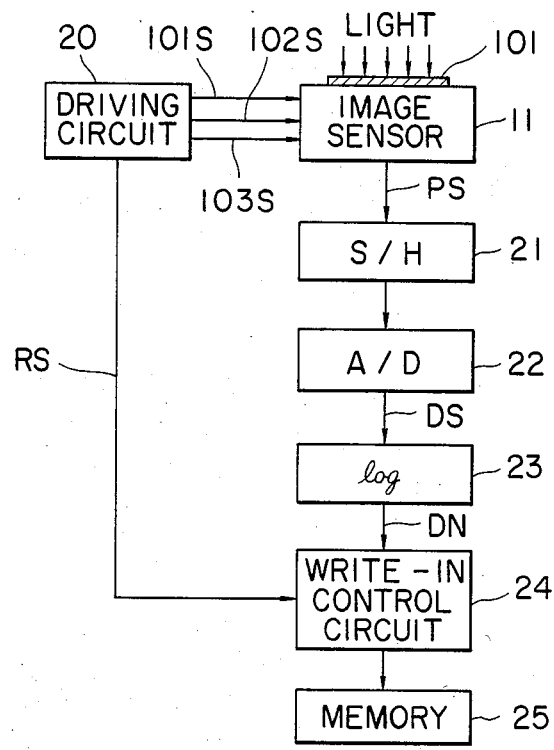
FIG. 4 is a block diagram of the control system thereof.

The two-dimensional image sensor 11 comprises, as shown in FIG. 3, an image pickup section 101 for optically picking up an image, and a storage section 102 for storing charges transmitted from the image pickup section 101, and an output register 103 for outputting the charges stored in the storage section 102. By controlling driving signals 101S through 103S from a driving circuit, the image information in two-dimensions (area) is photoelectrically converted and outputted serially from the output register 103 in the form of an anolog image signal PS. The circuit mounted on the substrate board 13 has, for example, a circuit structure shown in FIG. 4. The image sensor 11 is driven by driving signals 101S through 103S supplied from the driving circuit 20. The light illuminating the image pickup section 101 of the image sensor 11 is outputted from the output register 103 as a picture signal PS, sampled and held by a sample-and-hold circuit 21 at a predetermined sampling cycle. The same value thereof is converted by an analog-to-digital (A/D) converter 22 into digital signals DS. The digital signals DS from the A/D converter 22 are inputted into a logarithmic converter 23 for logarithmic conversion, then converted to density signals DN, and passed through a write-in control circuit 24 and finally written in a memory 25.

A reading speed signal RS from the driving circuit 20 is inputted into the write-in control circuit 24 in order to read out image information at a predetermined speed when the image sensor 11 is driven. The write-in control circuit 24 writes in the density signals DS at predetermined positions of a memory sequentially and correspondingly with the driving speed of the image sensor 11. In other words, the reading speed of the image sensor 11 is determined by the driving speed. The reading speed in turn determines the segmentation number of pixels with respect to an image area. The memory 25 should therefore store the detected information in correspondence with the number of pixels, too.

Figure 5:
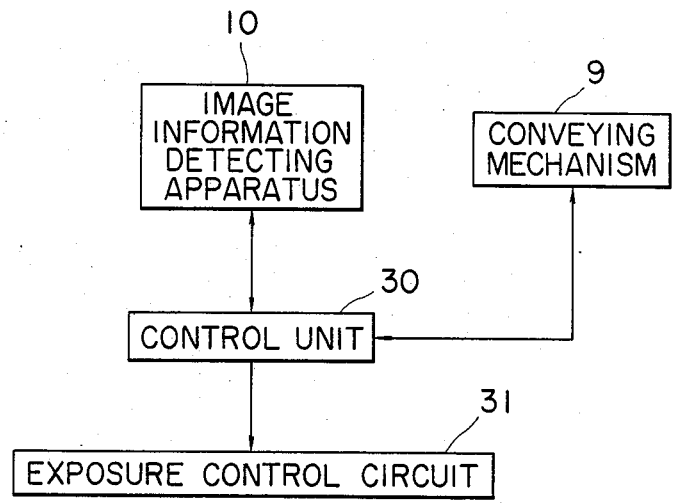
FIG. 5 is a block diagram of the whole control system according to this invention.

FIG. 5 shows the whole control system wherein an image information detecting apparatus 10 and a conveying mechanism 9 are controlled by a control unit 30 comprising a micro-computer. The detection/suspending method of image frames with such a conveying mechanism 9 is disclosed by the present applicant in U.S. patent applications Ser. No. 709,121 and Ser. No. 791,997 to Fumio Matsumoto. The control unit 30 calculates an exposure amount according to a predetermined formula with the detected information supplied from the image information detecting apparatus 10 and inputs the determined exposure amount to an exposure control circuit 31. The exposure control circuit 31 controls the color compensation for the color compensation means 3, and the amount of light from the light source 4 and the black shutter 6 and then exposes frame images on the negative film 2 on the photographic paper 7.

If the detection of bar code information 203 is not necessary as is the conventional case, the light transmitted through the negative film 2 which is mounted stationarily at a printing section is detected by photosensors 8, and the color compensation means 3 is adjusted in accordance with the image signals in each of the three primary colors of RGB, and the black shutter 6 is opened so as to expose the photographic paper 7 with the exposure amount of light thus determined.

According to this invention, the image information detecting apparatus 10 comprising the two-dimensional image sensor 11 of the area scanning type is mounted at a position near the negative film 2. The whole frame of the negative film 2 is segmented into a large number of arrayed pixels for detecting image information. In other words, when predetermined driving signals 101S through 103S are fed from the driving circuit 20 to the image sensor 11, the two-dimensional image sensor 11 is adapted to receive the light transmitted through the negative film 2 on the printing section via the lens unit 12. The two-dimensional image sensor 11 can therefore scan the whole surface of a frame of the negative film 2 along the scanning lines SL sequentially by segmenting the whole area (e.g. the region 210 in FIG. 1A) into a large number of small arrayed pixels 2A as shown in FIG. 6A. After the whole area has been scanned, the output register 103 of the image sensor 11 outputs a picture signal PS sequentially; then, the picture signal PS is sampled and held by the sample-and-hold circuit 21 and the sampled valve thereof is converted by the A/D converter 22 into digital signals DS. The digital signals DS from the A/D converter 22 are logarithmically converted by a logarithmic converter 23 to density signals DN. The density signals DN are controlled by a write-in circuit 24 to be stored in the memory 25 in the arrays corresponding to the pixels 2A as shown in FIG. 6B and in terms of the density digital values of the negative film 2.

If the digital values for respective pixels of the negative film 2 or the density values for respective elements with respect to three primary colors are stored in the memory 25, it is possible to read out the digital values for any particular pixels of the negative film 2 out of the memory 25. If the density values for respective three primary colors of R, G and B are stored as shown in FIG. 6B, then it is possible to read out such values from the memory for processing (which will be described hereinafter) in order to determine the exposure amount or correction amount for photographic printing in the same manner as in the prior art.

After the development, the negative film 2 in an elongated form or a shorter form (for instance, a unit of six frames) is sequentially and automatically conveyed to the printing section by the conveying mechanism 9 via the control unit 30 and then mounted thereon manually or automatically one piece at a time. As shown in FIG. 7, an upper guide 1B of a rectangular shape having an aperture 1A and a lower guide 1C are engaged to hold the negative film 2 therebetween for the printing operation. The size of the aperture 1A of the upper guide 1B completely corresponds with the frame size of the negative film 2 and therefore, an unimaged marginal portion of the negative film 2 does not protrude from the edges of the aperture 1A of the upper guide 1B. The region of the two-dimensional image sensor 11 which receives light is usually determined so as to be wide enough to include the portions of the upper guide 1B which do not let the light pass so that the image sensor 11 can detect not only image frames but can accommodate larger film sizes. The image information which can be detected by the two-dimensional image sensor 11 is as shown in FIG. 8A for a 110 size negative film while it is the one shown in FIG. 8B for a 135 size negative film. FIGS. 8A and 8B show the state where no negative film is mounted, or no image is recorded on the negative film 2 wherein the portion enclosed by broken lines at the center denotes the region inside the aperture 1A or the area of an imaged frame. Since the size of the image frame corresponds to the size of the negative film 2, it is possible to detect the length or the area of the aperture 1A by detecting and counting the density "0⇌" areas from the image information read out by the image sensor 11. The density "0" denotes that the portion is not imaged. In other words, it is possible to automatically determine the size of the negative film 2. Since the optical axis of the image sensor 11 is directed substantially toward the center of the aperture 1A, the size of the negative film 2 can be determined by counting the number of pixels having the density "0" (or near value) using either hardware or software, and comparing the counted number with a predetermined reference value set for each size. The image detection of the negative film 2 is processed by using the above size information and at the same time the printing exposure amount is calculated in accordance with a predetermined formula. Through such a process, an optimum exposure amount for any film size can be obtained.

Figure 9:
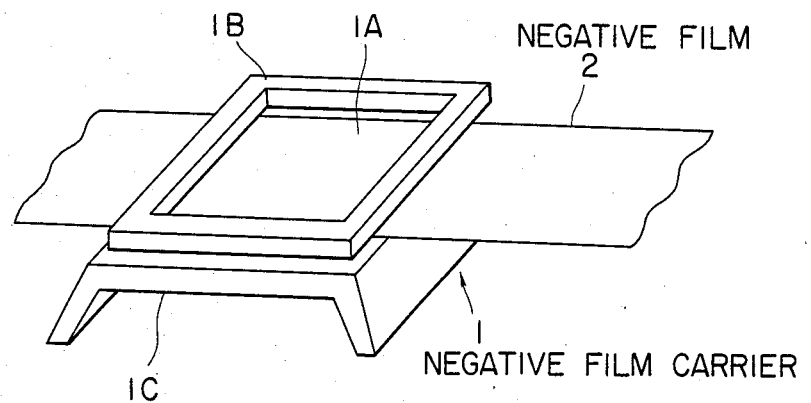
FIG. 9 is a view which shows an embodiment of the printing section according to this invention.

The aforementioned description relates to the case where no marginal information such as bar codes 203 is recorded on the negative film 2. In the case where the marginal information such as prescribed bar codes 203 and so on is recorded on the negative film 2 as shown in FIG. 1A, the two-dimensional image sensor 11 should receive light from the region 210. To achieve such purpose, according to this invention, the size of the upper guide 1B is determined so as to be wide enough to protrude from the edges of the negative film 2 on both sides as shown in FIG. 9. If the size of the negative filom carrier 1 is set to be larger than that of the frame of the negative film 2, it becomes possible to detect not only the frame 204 but also the perforations 201 and 202 with the two-dimensional image sensor 11, which in turn enables detection of bar codes 203 and so on recorded near the perforations 202. During exposure processing, information not only for imaged frame 204 but also for the marginal areas are detected by the image information detecting apparatus 10, however. For printing purposes, the image information should be selected from areas enclosed by broken lines at the center as shown in FIGS. 8A and 8B depending on their size. The size can be detected by the aforementioned methods.

Figure 10:
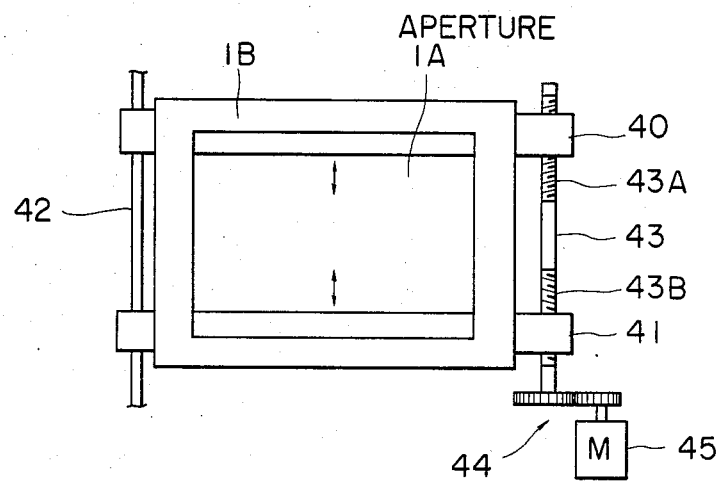
FIG. 10 is a view which shows another embodiment thereof.

Scattered light from the perforations 201 and 202 may reach the photographic paper 7 to cause flare at the time of printing and lower the quality. In such a case, an ND (neutral density) filter of a suitable value may be partially attached. Alternatively, the size of the aperture 1A of the negative film carrier 1 may be switched by a signal from the photographic printer as shown in FIG. 10. More particularly, guide plates 40 and 41 are provided between the upper and the lower guides 1B and 1C in a manner to allow up and down movements thereof as shown in FIG. 10. The guide plates 40 and 41 are mated with a lead screw 43 on one side thereof and engaged with a guide rod 42 on the other side thereof. If the lead screw 43 is threaded in a manner that the pitches 43A and 43B for the guide plates 40 and 41 are respectively counter-directional, the guide plates 40 and 41 may be moved in opposite directions by rotating the lead screw 43 by a motor 45 via gears 44. By driving the motor 45 in a normal direction, the aperture 1A can be widened while it can be narrowed by driving it in a reverse direction. This widening/narrowing mechanism can be realized by means of a shutter system with a solenoid drive. With such a means of driving the mechanism, the aperture 1A may be expanded to the region 210 shown in FIG. 1A when the marginal information should be detected while it may be narrowed to the one shown in FIG. 7 when the frame image 204 should be printed on the photographic paper 7. In this way, detection and printing of photographic image information may be conducted on a negative film carrier without being affected by flare. When the detection of perforations 201 and 202 is not necessary, a conventional negative film carrier can be used as is (refer to FIG. 7). A slit ST may be provided at a light transmitting position for the bar codes 203 on the negative film 2 so that the bar code information can be detected through the slit ST.

Figure 1B:
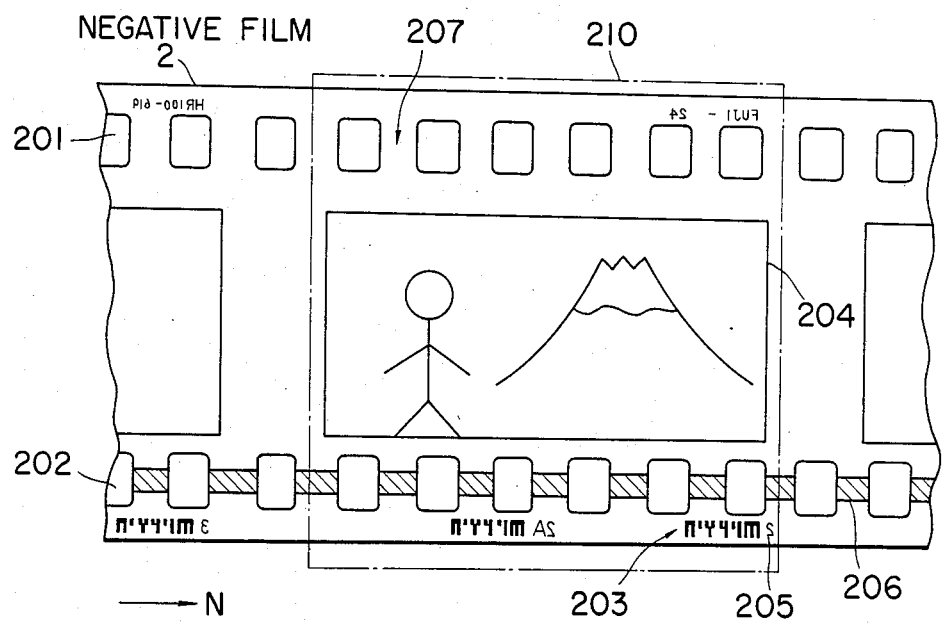
Figure 1C:
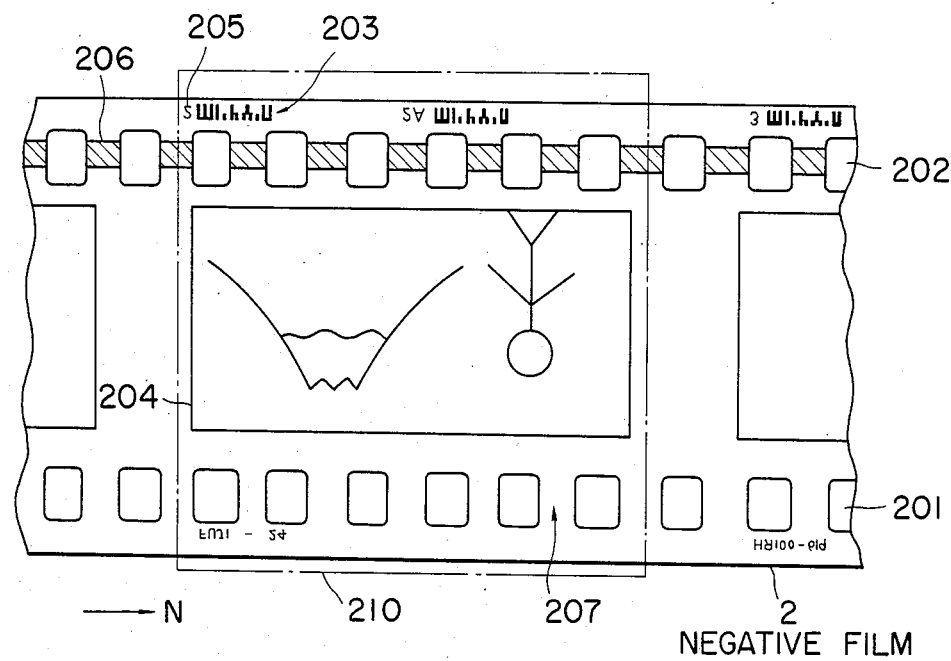
Figure 1D:
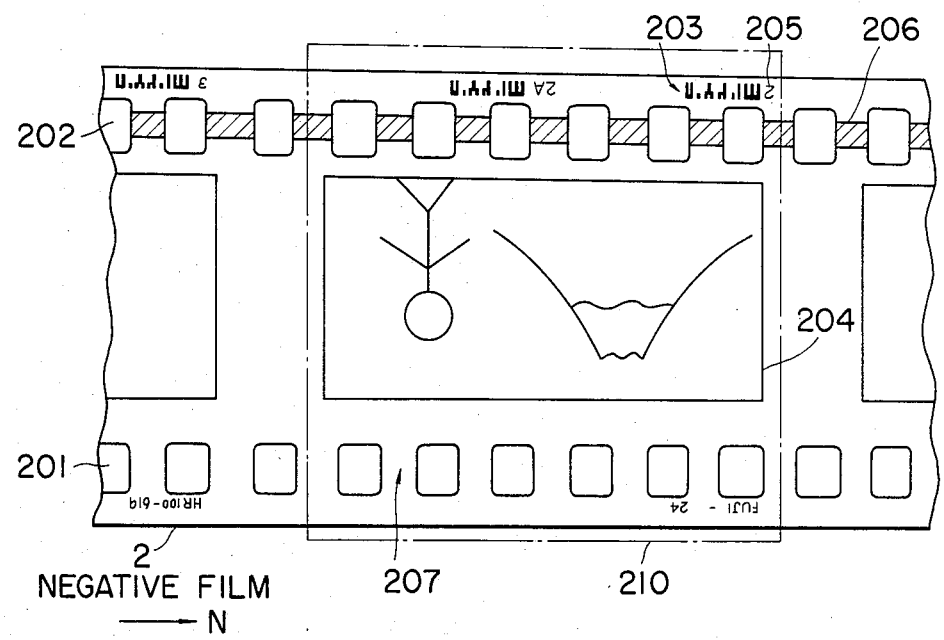
Figure 11:
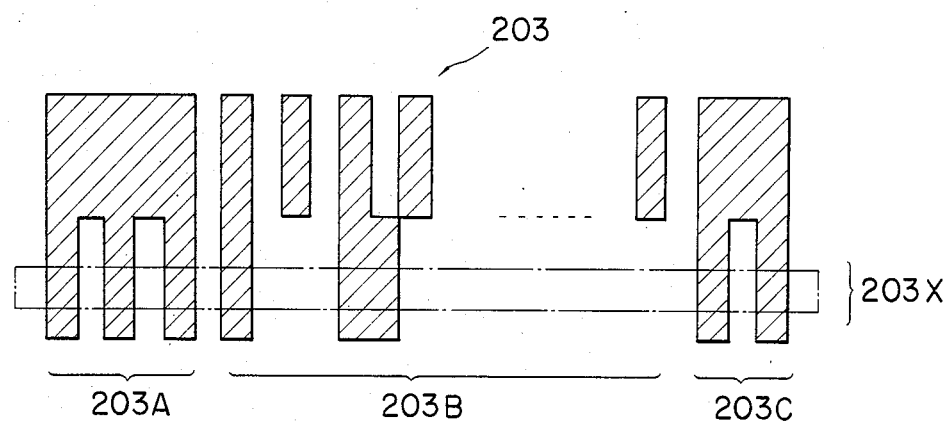
FIG. 11 is a view which shows details of a bar code.

FIG. 11 shows the format of the bar codes 203 which is attached on the marginal area of the negative film 2 which comprises a signal track consisting of a start mark 203A, data area 203B and an end mark 203C and a synchronizing track corresponding to the signal track. The start mark 203A and end mark 203C are constant, respectively. If the start and end marks 203A and 203C out of the bar code information 203 are detected and the order and positional relation are specified by the aforementioned image information detecting apparatus 10, the front surface of the film 2 can be discriminated from the back surface thereof or the top of the film 2 can be discriminated from the bottom of the film 2. More particularly, if it is assumed that FIG. 1A illustrates the reference status of the negative film 2 and the arrow mark N denotes the detection order, when the end mark 203C is detected first and then the start mark 203A is detected, this indicates the negative film 2 is being printed on the wrong or reverse side as shown in FIG. 1B. Even if the sequential order is right, when those marks are detected at wrong positions (for instance, if they are detected at the top although they should be at the bottom), it indicates that the negative film 2 is being printed on the wrong side and upside down as indicated in FIG. 1C. If the sequence is wrong and the position is upside down, then the negative film 2 is inverted as shown in FIG. 1D. If the operator is notified by a buzzing sound when such an inversion or reversal is detected, erroneous printing may be prevented in advance. If the negative film 2 is mounted in an inversed manner, the printing exposure amount and correction amount may be determined by inverting the positional relationship of the data for each pixel for processing as shown in FIG. 8B.

Figure 12:
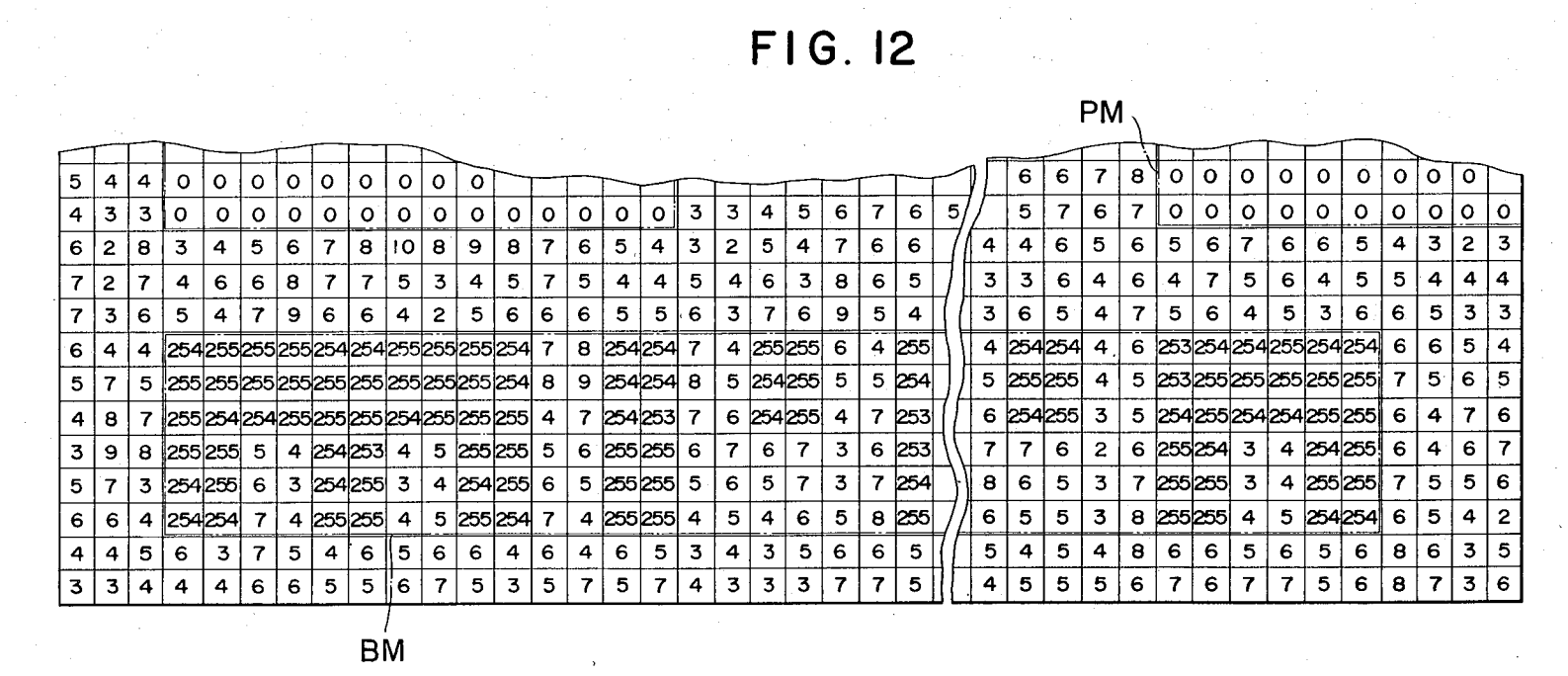

FIG. 12 shows an example of data arrays on the memory of a two-dimensional image sensor 11 which corresponds to FIG. 11. In the figure, the perforation 202 has the density "0" since it is a hole which lets all of the light pass therethrough. Since the density "0" is continuously detected in lateral direction at the same size, the perforation 202 may possibly be detected electrically by the image sensor (refer to the portion PM enclosed by dot-and-dash lines in FIG. 12). Bar code data information 203 is recorded in the unit of a bit near the perforation 202 and inside the edge of the negative film 2 in a corresponding relationship to the position of the each perforation. The first bit in an advancing direction or the first bit of the start mark 203A is constantly determined to be "1" or "0" (refer to the portion BM enclosed by dot-and-dash lines in FIG. 12). By discriminating the position of bits of the bar code information 203 sequentially from the reference position and by converting density data into binary codes for each pixel, if necessary, the bit status may be discriminated. The image information is not limited to density data, but the bit status can be discriminated by using anti-logarithmic data. As described above, the bar code information 203 recorded on the negative film 2 is identified by reading out and discriminating the information for each pixel which has been detected by the two-dimensional image sensor 11. The image information of the frame image 204 can be detected simultaneously. Since the start and end mark 203A and 203C are constant, the positional relationship between these two marks is easily judged.

The above mentioned method may be applied for discriminating the top, the bottom, the front surface or the back surface in any combination thereof.

Figure 13:
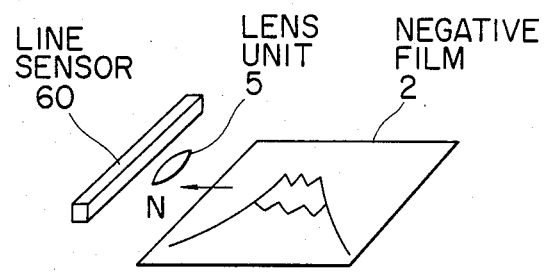
FIG. 13 is a view of another embodiment of an image information detecting apparatus.

Although the above is related to the discrimination by bar code bits, discrimination may be readily performed by using side prints such as frame numbers by means of a pattern matching technique or a character recognition technique with a characteristic extraction method which is widely used. In the pattern matching technique, a sample pattern is superposed on a reference pattern for discrimination. If the reference pattern is stored in a dictionary memory and compared with the sample, the similarity between the two can be expressed. In the characteristic extraction technique, such characteristic values as the area, length, circumference, angle, curvature of a pattern are compared with preset reference values for discrimination. Although the image information and the marginal information are detected by an optical system of a two-dimensional (area) scanning-type image sensor, the area may be detected by a one-dimensional sensor if the original film or the line sensor 60 is relatively moved as shown in FIG. 13. A contact type optical system may be used. Alternatively the portion 203x enclosed by dot-and-dash lines in FIG. 11 alone may be extracted out of the bar code information and detected by one or more line sensors for discrimination. The foregoing description is given for a photographic printer, but this invention is applicable with similar techniques to other recording medium, e.g.—magnetic tape, optical discs, magnetic disc film, etc.

Besides the information on the bar codes 203 or the side prints, the density or color data on the side belt 206 or on the film carrier color 207 may be detected by adjusting mosaic color filters or the color compensation means 3 which are closely attached to the image sensor 11. If this detected information is compared with the density or the color data of a reference film, films with chronological changes or abnormal conditions may be detected to alert the operator. Needless to say, notches or marks applied on the negative film 2 in the process before or after the development may be detected by the similar technique.

As described in the foregoing, this invention enables detection of not only data on imaged frames but of information on marginal areas of the negative film which is mounted stationarily in a photographic printer in the state of a large number of pixel segments and without contact to realize detection of photographic images with an inexpensive and simple structure. The method is very convenient since it does not need to set conditions for each film even if different films are mounted. Since the method allows detection of not only the information on imaged frames but the information on marginal areas, photographic printing can be conducted at a higher speed and at a higher efficiency.

According to this invention, the information recorded outside frames including those recorded at margins of an original film are detected since they are segmented into a large number of pixels by a line sensor or an image sensor and at the same time, start and end marks on the bar codes are detected for each frame. By automatically discriminating the top from the bottom and the front from the back surface of the film frame from the detected information, which errors otherwise might be made in mounting may be prevented so as to further enhance accuracy and efficiency in photographic printing.

It should be understood that many modifications and adaptations of the invention will become apparent to those skilled in the art and it is intended to encompass such obvious modifications and changes in the scope of the claims appended hereto.

What is claimed is:

1. A method for detecting photographic image information which comprises the steps of:
   receiving light from an original film and projecting the light upon an image sensor;
   detecting image information corresponding to all areas of the original film as pixel units obtained by segmenting a frame of the film; and
   detecting marginal information which has been recorded outside of the frame of the original film.

2. A method for detecting photographic image information as claimed in claim 1, wherein the original film is a film negative of a short length.

3. A method for detecting photographic image information as claimed in claim 1, wherein the marginal information includes at least one of bar codes, side prints, side belts, film carrier color, notches or marks.

4. A method for detecting photographic image information as claimed in claim 1, wherein the image sensor is a two-dimensional image sensor.

5. A method for detecting photographic image information as claimed in claim 1, wherein the image sensor is a one-dimensional line sensor and either the original film or the one-dimensional line sensor is moved relation to the other for detection.

6. A device for detecting photographic image information comprising: a light system which illuminates the entire area of one frame of a mounted original film; an image sensor for receiving and detecting the light passing through said original film, and a control system for controlling said image sensor wherein frame image information recorded on said original film and marginal information recorded outside of said frame are detected by said image sensor.

7. A device for detecting photographic image information as claimed in claim 6, wherein said image sensor comprises a two-dimensional image sensor.

8. A device for detecting photographic image information as claimed in claim 6, wherein said image sensor comprises a one-dimensional line sensor which is adapted to move with respect to said original film.

9. A device for detecting photographic image information, as claimed in claim 6, wherein said two-dimensional image sensor is inclined from an optical axis of said light system.

10. A method for processing detected image data which comprises the steps of:
    receiving light from an original film and projecting the light upon a line sensor;
    detecting image information which has been recorded outside of a frame of said original film in pixel units;
    detecting marginal information on said frame which has been recorded outside of said frame of said original film; and
    discriminating at least one of a front surface of the original film from a back surface thereof or a top surface from a bottom surface thereof in accordance with the marginal information.

11. A method for processing detected image data as claimed in claim 10, wherein said marginal information comprise start marks and end marks of bar codes.

12. A method for detecting and processing image information which comprises the steps of:
    receiving light from an original film and projecting the light upon an image sensor;
    detecting image information from the original film in pixel units obtained by segmenting a frame of the film;
    detecting marginal information on the frame which has been recorded outside of the frame of the original film; and
    discriminating at least one of a front surface of the original film from a back surface thereof or a top surface from a bottom surface thereof in accordance with the marginal information.

13. A method for detecting and processing image information as claimed in claim 12, wherein the marginal information are one of either the start marks and end marks of bar codes or frame numbers of side prints.

* * * * *